(12) United States Patent
Basu et al.

(10) Patent No.: US 10,311,375 B2
(45) Date of Patent: Jun. 4, 2019

(54) SYSTEMS AND METHODS FOR CLASSIFYING ELECTRICAL SIGNALS

(71) Applicant: NANYANG TECHNOLOGICAL UNIVERSITY, Singapore (SG)

(72) Inventors: Arindam Basu, Singapore (SG); Enyi Yao, Singapore (SG); Yi Chen, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 716 days.

(21) Appl. No.: 14/885,462

(22) Filed: Oct. 16, 2015

(65) Prior Publication Data
US 2016/0110643 A1 Apr. 21, 2016

(30) Foreign Application Priority Data
Oct. 16, 2014 (SG) .......................... 10201406665V

(51) Int. Cl.
*G06N 20/00* (2019.01)
(52) U.S. Cl.
CPC .................................. *G06N 20/00* (2019.01)
(58) Field of Classification Search
USPC ........................................................ 706/22
See application file for complete search history.

(56) References Cited

U.S. PATENT DOCUMENTS

| 5,323,157 | A | * | 6/1994 | Ledzius | ................ | H03M 3/504 |
| | | | | | | 341/136 |
| 6,639,537 | B1 | * | 10/2003 | Raz | ..................... | H03M 1/0626 |
| | | | | | | 341/143 |
| 6,801,086 | B1 | * | 10/2004 | Chandrasekaran | ... | H03F 1/3247 |
| | | | | | | 330/140 |
| 9,717,440 | B2 | * | 8/2017 | Abdelghani | ....... | A61B 5/04888 |
| 2008/0294579 | A1 | | 11/2008 | Rapoport et al. | | |

OTHER PUBLICATIONS

IEEE Transactions on Neural Systems and Rehabilitation Engineering, vol. 11, No. 1, Mar. 2003 A Miniaturized Neuroprosthesis Suitable for Implantation Into the Brain Mohammad Mojarradi, David Binkley, Benjamin Blalock, Richard Andersen, Norbert Ulshoefer, Travis Johnson and Linda Del Castill, pp. 38-42 1534-4320/03$17. 00 2003 IEEE.*

(Continued)

*Primary Examiner* — Michael B Holmes

(57) ABSTRACT

An analog implementation is proposed of an adaptive signal processing model of a kind requiring a plurality of randomly-set variables. In particular, following a digital to analog conversion of a digital input signal, analog processing is used to transform the data input to the model into data which is subsequently processed by an adaptively-created layer of the model. In the analog processing, multiplication operations involving the randomly-set variables are performed by analog circuitry in which the randomly-set variables are the consequence of inherent tolerances in electrical components. This eliminates the need for the randomly-set variables to be implemented in some other way, for example as random variables stored in memory.

20 Claims, 13 Drawing Sheets

(56) References Cited

OTHER PUBLICATIONS

IEEE—An adaptive digital controller for a unity power factor converter, A.H. Mitwalli; S.B. Leeb G.C. Verghese; V.J. Thottuvelil Published in: IEEE Transactions on Power Electronics ( vol. 11 , Issue: 2 , Mar. 1996) pp. 374-382.*
IEEE—Programmable analog vector-matrix multipliers, F.J. Kub; K.K. Moon; I.A. Mack; F.M. Long, Published in: IEEE Journal of Solid-State Circuits ( vol. 25 , Issue: 1 , Feb. 1990) pp. 207-214.*
IEEE—Multibit—PWM Digital Controller IC for DC-DC Converters Operating at Switching Frequencies Beyond 10 MHz Zdravko Lukic; Nabeel Rahman; Aleksandar Prodie Published in: IEEE Transactions on Power Electronics ( vol. 22 , Issue: 5 , Sep. 2007) pp. 1693-1707.*
Yao, Enyi, et al., "Computation using Mismatch: Neuromorphic Extreme Learning Machines", 978-1-4799-1471, 2013, IEEE.
Lichtsteiner, Patrick, et al., "A 128×128 120 db 15 ms Latency Asynchronous Temporal Contrast Vision Sensor", IEEE Journal of Solid-State Circuits, vol. 43 No. 2, Feb. 2008.
Chan, Vincent, et al., "AER EAR: A Matched Silicon Cochlea Pair With Address Event Representation Interface", IEEE Transactions o nCircuits and Systems—I: Regular Papers, vol. 54, No. 1, Jan. 2007.
Huang, Guang-Bin, et al, "Extreme Learning Machine for Regression and Multiclass Classification" IEEE Transactions on Systems, Man and Cybernetics—Part B: Cybernetics, vol. 42, No. 2, Apr. 2012.
Basu, Arindam, "Low-power Biomimetic and Biomedical Analog Circuits", Power Point Presentation, Nanyang Technological University of Singapore, Jul. 25, 2014.
Rapoport, Benjamin I., et al., "Efficient Universal Computing Architectures for Decoding Neural Activity", PLOS ONE, vol. 7, Issue 9, Sep. 2012.
Kuan, Ta-Wen, et al., "VLSI Design of an SVM Learning Core on Sequential Minimal Optimization Algorithm", IEEE Transactions on Very Large Scale Integration VLSI Systems, vol. 20, No. 3, Apr. 2012.
Kang, Kyunghee, et al., "An On-Chip-Trainable Gaussian-Kernel Analog Support Vector Machine", IEEE Transactions on Circuits and Systems—I: Regular Papers, vol. 57, No. 7, Jul. 2010.
Anguita, Davide, et al., "A Digital Architecture for Support Vector Machines: Theory, Algorithm, and FPGA Implementaion" IEEE Transactions on Neural Networks, vol. 14, No. 5, Sep. 2003.
Anguita, D., et al., "Learning algorithm for nonlinear support vector machines suited for digital VLSI", Electronic Letters, vol. 35, No. 16, Aug. 5, 1999.
Lee, Kyong Ho., "A Low-Power Processor With Configurable Embedded Machine-Learning Accelerators for High-Order and Adaptive Analysis of Medical-Sensor Signals", IEEE Journal of Solid-State Circuits, vol. 48, No. 7 Jul. 2013.
Chakrabartty, Shantanu, et al., "Sub-Microwatt Analog VLSI Trainable Pattern Classifier", IEEE Journal of Solid-State Circuits, vol. 42, No. 5, May 2007.
Kucher, Paul, et al., "An Energy-Scalable Margin Propagation-Based Analog VLSI Support Vector Machine", 1-4244-0921-7/07, IEEE 2007.
Peng, Sheng-Yu, et al., "Analog VLSI Implementation of Support Vector Machine Learning and Classification", 978-1-4244-1684-4/08, IEEE, 2008.
Lu, Junjie, "A 1 TOPS/W Analog Deep Machine-Learning Engine With Floating-Gate Storage in 0.13mm CMOS", IEEE Journal of Solid-State Circuits, vol. 50, No. 1, Jan. 2015.
Decherchi, Sergio, et al., "Efficient Digital Implementation of Extreme Learning Machines for Classification", IEEE Transactions on Circuits and Systems—II: Express Briefs, vol. 59, No. 8, Aug. 2012.
Basu, Arindam, et al., "Silicon spiking neurons for hardware implementation of extreme learning machines", Neurocomputing 102, Aug. 25, 2012.
Delbruck, Tobi, et al., "Bias Current Generators with Wide Dynamic Range", Analog Integrated Circuits and Signal Processing, 42, 247-268, 2005.
Neftci, Emre, et al., "A Device Mismatch Compensation Method for VLSI Neural Networks", 978-1-4244-7268-0/10, IEEE 2010.
Huang, Guang-Bin, et al., "Extreme learning machine: Theory and applications", Neurocomputing 70 489-501, May 16, 2006.
Sukumaran, Dinup, et al., "A low-power, reconfigurable smart sensor system for EEG acquisition and classification", 2012 IEEE Asia Pacific Conference on Circuits and Systems (APCCAS), pp. 9-12.
Poliakov, Andrew V., et al., "Limited Functional Grouping of Neurons in the Motor Cortex Hand Area During Individuated Finger Movements: A Cluster Analysis", 022-3077, The American Physiological Society, 1999.
"Data Center" Wikipedia, http://en.wikipedia.org/wiki/Data_center#energy_efficiency, Jan. 22, 2016.
Maass, Wolfgang, et al., "Real-Time Computing Without Stable States: A New Framework for Neural Computation Based on Perturbations", Neural Computation vol. 14, Massachusetts Institute of Technology, 2002.
Jaeger, Herbert, et al., "Harnessing Nonlinearity: Predicting Chaotic Systems and Saving Energy in Wireless Communication", Science magazine, vol. 304, Apr. 2, 2004.
Bartolozzi, Chiara, et al., "Synaptic Dynamics in Analog VLSI", Neural Computation vol. 19, Massachusetts Institute of Technology, 2007.
Indiveri, Giacomo, et al., "Neuomorphic silicon neuron circuits", Frontiers in Neuroscience, Neuromorphic Engineering, vol. 5, Article 72, May 2011.
Chen, Tung-Chien, et al., "A Biomedical Multiprocessor SoC for Closed-Loop Neuroprosthetic Applications", IEEE International Solid-State Circuits Conference 2009.
Kao, Jonathan C., et al., "Information Systems Opportunities in Brain-Machine Interface Decoders", Proceedings of the IEEE, vol. 102, No. 5 May 5, 2014.
Aggarwal, Vikram, et al., "Asynchronous Decoding of Dexterous Finger Movements Using M1 Neurons" IEEE Transactions on Neural Systems and Rehabilitation Engineering, vol. 16, No. 1, Feb. 2008.

* cited by examiner

| Chip Summary | |
|---|---|
| Technology | 0.35 μm 2P4M |
| Die Size | 4.95X4.95mm² |
| Supply Voltage | 1.2V (Analog) |
| | 0.6V (Digital) |
| Power Dissipation | 0.4μW |
| Energy efficiency | 290GMACS/W |
| Classification rate | 50Hz |
| Algorithm | Extreme Learning Machine |
| Feature | Time delayed sample based feature dimension enhancement |
| CCO neuron resolution | 14b |
| Input DAC resolution | 6b |
| Maximum input spike | 640Hz |

PRIOR ART

SYSTEMS AND METHODS FOR CLASSIFYING ELECTRICAL SIGNALS

CROSS-REFERENCE TO RELATED APPLICATIONS

This applications claims priority to Singapore Application No. SG 10201406665V filed with the Intellectual Property Office of Singapore on Oct. 16, 2014 and entitled "Systems and methods for classifying electrical signals", which is incorporated herein by reference in its entirety for all purposes.

FIELD OF THE INVENTION

The present invention relates to automatic systems and method for decoding electrical signals collected by a sensor, such as signals detected by sensor(s) in the brain of an animal.

BACKGROUND OF THE INVENTION

With the rapid increase of wireless sensors and the advent of the age of "Internet of Things" and "Big Data Computing", there is a strong need for low-power machine learning systems that can help reduce the data being generated by intelligently processing it at the source. This not only relieves the user of making sense of all of this data but also reduces power dissipation in transmission making the sensor node run much longer on battery. Data reduction is also a necessity for biomedical implants where it is impossible to transmit all of the generated data wirelessly due to bandwidth constraints of implanted transmitters.

As an example, consider brain machine interface (BMI) based neural prosthesis—an emerging technology for enabling direct control of prosthesis from neural signal of the brain of the paralyzed persons. As shown in FIG. 1, one or a set of micro-electrodes arrays (MEAs) are implanted into cortical tissue of the brain to enable single-unit acquisition (SUA) or multi-unit acquisition (MUA), and the signal is recorded by a neural recording circuit. The recorded neural signal, i.e. sequences of action potential from different neurons around the electrodes, carries the information of motor intention of the subject.

The signal is transmitted out of the subject to a computer where neural signal decoding is performed. Neural signal decoding is a process of extracting the motor intention embedded in the recorded neural signal. The output of neural signal decoding is a control signal. The control signal is used as a command to control the prosthesis, such as a prosthesis arm. Through this process, the subject can move the prosthesis by simply thinking. The subject sees the prosthesis move (creating visual feedback to the brain) and typically also feels it move (creating sensory feedback to the brain).

Next generation neural prosthesis requires one or several miniaturized devices implanted into different regions of the brain cortex, featuring integration of up to a thousand electrodes, both neural recording and sensory feedback, and wireless data and power link to reduce the risk of infection and enable long-term and daily use. The tasks of neural prosthesis are also extended from simple grasp and reach to more sophisticated daily movement of upper limb and locomotive bipedal. A major concern in this vision is the power consumption of the electronics devices in the neural prosthesis. Power consumption of the implanted circuits are highly restricted to prevent tissue damage caused by the heat dissipation of the circuits. Furthermore, implanted devices are predominantly supplied by a small battery or wireless power link, making the power budget even more restricted, assuming a long-term operation of the devices. As the number of electrodes increases, higher channel count makes it a more challenging task, calling for optimization of each functional block as well as system architecture.

Another issue that arises with the increasing number of electrodes is the need to transmit large amount of recorded neural data wirelessly from the implanted circuits to devices external to the patient. This puts a very heavy burden on the implanted device. In a neural recording device with 100 electrodes, for instance, with typical sampling rate at 25 Ksa/s and a resolution of 8 bits, the wireless data rate can be as high as 20 Mb/s. Some methods of data compression are therefore highly desirable. It would be desirable to include a machine learning capability for neural signal decoding on-chip in the implanted circuitry, to provide an effective way of data compression. For example, this might make it possible to transmitted wirelessly out of the subject only the prosthesis command (e.g. which finger to move (5 choices) and in which direction (2 choices) for a total of 10 options, which can be be encoded in 4 bits). Even if this is not possible, it might be feasible to wirelessly transmit only some pre-processed data with reduced data rate compared to the recorded neural data.

Though digital processors have benefited from transistor scaling due to Moore's law, they are inherently inefficient at performing machine learning computations that require a large number of multiply operations. Analog processing on the other hand provides very power efficient solutions to performing elementary calculations like multiplication [7]; however, historically, analog computing has been difficult to scale to large systems for several reasons, a major one being device mismatch. With transistor dimensions reducing over the years, variance in properties of transistors, notably the threshold voltage, has kept on increasing making it difficult to rely on conventional simulations ignoring statistical variations. The problem is particularly exacerbated for neuromorphic designs, where transistors are typically biased in sub-threshold region of operation (to glean maximal efficiencies in energy per operation) since device currents are exponentially related to threshold voltages, thus amplifying their variations as well. In general, there has been an approach to compensate for mismatch either through floating-gates or otherwise. Sometimes, it is claimed that learning can compensate for mismatch—but the claim needs to be quantified since mismatch will exist in the learning circuits as well [1].

Hence, it would be useful to develop a low-power, analog computing based machine learning systems that can operate even with the large amount of statistical variation that is prevalent in today's semiconductor processes.

In the field of BMI, the neural decoding algorithms used are predominantly based on active filtering or statistical analysis. These highly sophisticated decoding algorithms work reasonably well in the experiments but requires significant amount of computation efforts. Therefore, the state-of-the art neural signal decoding are mainly conducted on either a software platform or on a microprocessor outside of the brain, consuming a considerable amount of power, thus making it impractical for the long-term and daily use of the neural prosthesis. As discussed above, the next generation neural prosthesis calls for a miniaturized and less power hungry neural signal decoding that achieves real-time decoding. Integrating the neural decoding algorithm with neural recording devices is also desired to reduce the wireless data transmission rate.

Until now, very little work has been done to give a solution for this problem. A low-power neural decoding architecture using analog computing is proposed [5], featuring optimizing the mapping in the training mode by continuous feeding of recorded neural signal and using the optimized mapping to generate the output in the operational mode. The architecture is largely an active filtering method involving massive parallel computing through low power analog filters and memories. Complicated learning algorithm of a modified gradient-descent approach is adopted on chip to minimize the error in a least-squares sense, adding to the complexity of the design. To achieve low power operation, sub-threshold design are used for lower biasing current, magnifying the mismatch and robustness issue in the analog circuits. Furthermore, except some SPICE simulation results, no measurement results are published to support the silicon viability of the architecture. A recent work proposes a universal computing architecture for neural signal decoding [6]. The architecture consists of internal part integrating with implanted neural recording device and external part. The internal part pre-process the neural signal at each time step by doing binary classification for a series of possible states according a set of pre-defined rules. Only classification decision vector is transmitted to external device, reducing data rate by a factor of 10000. The transmitted data is further processed by external device in a non-causal manner, selecting a most probable state. The computation power is distributed unbalanced between internal and external part, where internal part performs only light-weight logic but reduce data rate effectively and external part with less power constraint finishes more complicated computation required by the algorithm. The architecture is claimed to be universal, capable of implementing various decoding algorithm. An example using pattern matching algorithm is shown and implemented in field programmable gate array (FPGA) is shown with verification in rodent animal experiment. The power consumption of the FPGA for implementing this example is estimated to be 537 μW.

Custom hardware implementations of neural networks have many advantages over generic processor based ones in terms of speed, power and area. In the past, the Support Vector Machine (SVM) algorithm has been implemented in a single chip VLSI by many groups for various applications [7]-[14]. For example, [7] describes a digital synthesized SVM-based recognition system with sequential minimal optimization (SMO) algorithm in a FPGA. The authors in [8] developed an analog circuit architecture of Gaussian-kernel support vector machines having on-chip training capability. The problem with these SVM systems is that each parameter of the network has to been tuned one by one and sufficient memory is required for the storage of these parameters. As an alternative, floating-gate transistors could be used for non-volatile data storage and analog computation [12]-[15]. However, this will require special process (typically double poly process is used) for fabrication and additional charge programming stage for floating-gate devices. There is also a reliability issue if the weights need to be programmed frequently. Finally, the device size of a floating-gate based multiplier will be much larger than our minimum sized transistor based multiplier since the floating-gate device has to be a thick oxide one with minimum channel length typically larger than 350 nm.

SUMMARY OF THE INVENTION

The present invention aims to provide a new and useful system for decoding electrical signals, and for example one adapted to neural signal decoding.

In general terms, the invention proposes an analog implementation of an adaptive signal processing model of a kind requiring a plurality of randomly-set variables. In particular, following a digital to analog conversion of a digital input signal, analog processing is used to transform the data input to the model into data which is subsequently processed by an adaptively-created layer of the model. In the analog processing, multiplication operations involving the randomly-set variables are performed by analog circuitry in which the randomly-set variables are the consequence of inherent tolerances ("mismatch") in electrical components. This eliminates the need for the randomly-set variables to be implemented in some other way, for example as random variables stored in memory or generated using separate circuits such as random number generators.

One example of a suitable adaptive signal processing model is a two-layer neural network known as an Extreme Learning Machine (ELM). An ELM has a hidden layer of neurons connected to network inputs by corresponding connections characterized by randomly-set first layer weight values, and an output formed as a function of the outputs of the hidden layer of neurons where the function depends upon a set of tunable output weights. An ELM has been shown [4] to produce similar or better performance compared to support vector machines (SVM). The benefit of ELM is that the input weights are randomly assigned and only the output weight needs to be tuned by only one equation without any iteration. This makes an ELM suitable to be implemented in VLSI circuit with a faster speed and lower power consumption. [16] is the only reported VLSI implementation of the algorithm of ELM. It implements the ELM model on a reconfigurable digital hardware-complex programmable logic device (CPLD) and field-programmable gate array (FPGA). The input weights need to be random generated and saved in a memory. For each classification operation, it needs to access the memory to read these parameters, resulting in system power consumption as much as hundreds of milli-Watt for some applications.

By contrast, an embodiment of the invention in relation to this model is a two layer spiking neural network implementation of the Extreme Learning Machine (ELM) algorithm in which the calculation of the values of the outputs of the hidden layer of neurons is performed by analog circuitry in which the randomly-set variables in the first layer weights are the result of inherent tolerances in electrical components. The invention thus makes possible an analog design of the ELM with an employment of the VLSI process, and making use of inherent mismatch to obtain the random input weights, thus eliminating memory storage of the first layer weights.

In an expression of this concept, the present invention proposes an architecture to implement an ELM (or other analogous adaptive model) with a digital input which first converts the digital input to analog current using a digital analog converter (DAC), then performs the multiplication of input by randomly-set weights in the current domain, followed by digitization using an analog-digital converter (ADC).

Preferably, the randomly-set weights are due to the mismatch inherent in current mirror circuits operated in the sub-threshold regime. This weight is also non-volatile but does not require any special process step to create it. Accordingly, in an embodiment of the present invention a separate memory is needed only for the storage of the calculated output weights, and at least the first stage of the processing by the ELM does not require floating gate operations.

This makes it possible for an embodiment of the invention to dissipate much lower power compared to the digital one with no sacrifice of the performance. The improved power efficiency is more obvious for high dimensional classification problems. With this high power efficiency, this system is ideally suited for wearable applications, especially for biomedical sensors [17].

Also, the proposed method is scalable and has few problems than conventional devices with regard to scaling of devices to smaller sizes. Finally, the area required by the processor is very small since the multiplier only needs one minimum sized transistor.

As an alternative to an ELM, the present approach can be used in other adaptive signal processing algorithms, such as liquid state machines (LSM) or echo state networks (ESN) as well since they too require random projections of the input. That is, in these networks too, a first layer of the adaptive model employs fixed randomly-set parameters to perform multiplicative operations of the input signals, and the results are summed, Typically, in machine learning situations the data to be learned by the embodiment is presented in a binary encoded multi-digit digital format (that is, each of the independent signals input to the embodiment is a digital number which takes more than two possible values, and is encoded in a multi-digit (i.e. multi-bit) binary number). However, in some applications, such as data collected from neural implants, this data can be encoded in the frequency of digital pulses, e.g. each pulse is a "high" value on an input signal line, and when there is no pulse the input signal line takes a low value. Such signals may arise from artificial (non-biological) sources as well such as pulse streams emanating from bio-inspired visual [2] and auditory sensors [3]. The present invention can cater to both such types of data encoding.

For pulse frequency encoded (PFE) digital input, the input handling circuits (IHC) preferably has a provision of taking a moving average of the input pulse count over a pre-defined time window to give a binary encoded multi-digit output.

Also, the data to be classified might be time series data, i.e. samples of a signal taken over a length of time with the objective of understanding the evolution of these signals based on past history. For time series data classification, input handling circuits (IHC) preferably has the provision of passing the time delayed samples from one channel to the succeeding one to artificially increase the dimension of the input to the ELM.

In both cases, the binary encoded output is converted to analog currents using a DAC.

Embodiments of the invention may further include a circuit to feed time delayed input samples into the adaptive model, to artificially increase the dimension of input data for enhanced classification of time series.

The second layer of the adaptive signal processing model performs a multiplication operation on the outputs of the first layer, multiplying them by a set of variable parameters which had previously been obtained from a training process. The number of outputs of the first layer is typically significantly less than the number of inputs to the first layer, so the computational task performed by the second layer requires fewer multiplication operations, and can be performed by a processor in the form of an integrated circuit.

The variable parameters of the multiplication operation may be calculated during a training step (e.g. by a computer external to a subject in which the integrated circuit has been implanted), and then input to the integrated circuit through an interface. If the integrated circuit is located within a subject, the interface is typically a wireless interface. The calculation of the variable parameters outside the subject significantly reduces the power and computing requirements of the components implanted into the subject.

The output of the first layer of the adaptive signal processing network is converted from analog to digital form, with a non-linearity. This can conveniently be done using a current controlled oscillator (CCO) which clocks a counter and receives a sum of the results of a plurality of the multiplication operations as an input. A saturating nonlinearity is implemented by stopping the counter at a predefined saturation level. A threshold may be implemented by adding an offset current, such as a negative offset current, in the CCO.

The term "adaptive model" is used in this document to mean a computer-implemented model defined by a plurality of numerical parameters, including at least some which can be modified. The modifiable parameters are set (usually, but not always, iteratively) using training data illustrative of a computational task the adaptive model is to perform.

The present invention may be expressed in terms of a system, such as a system including at least one integrated circuit comprising the electronic circuits having the random tolerances. The system may be a component of an apparatus for controlling a prosthesis. Alternatively, it may be expressed as a method for training such a system, or even as program code (e.g. stored in a non-transitory manner in a tangible data storage device) for automatic performance of the method.

BRIEF DESCRIPTION OF THE DRAWINGS

Embodiments of the invention will now be described for the sake of example only with reference to the following figures in which.

DETAILED DESCRIPTION OF THE EMBODIMENTS

Figure 1:
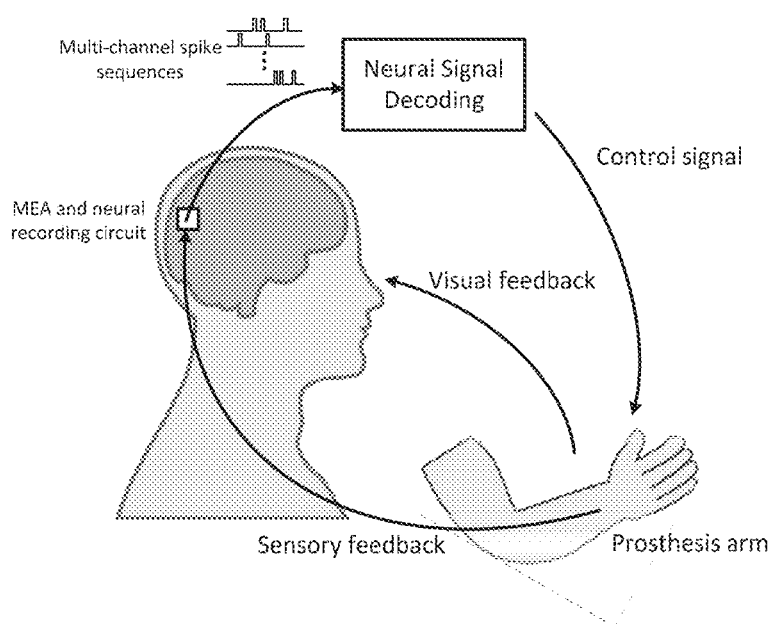
FIG. 1 shows schematically the known process of control of a prosthesis.
Figure 2:
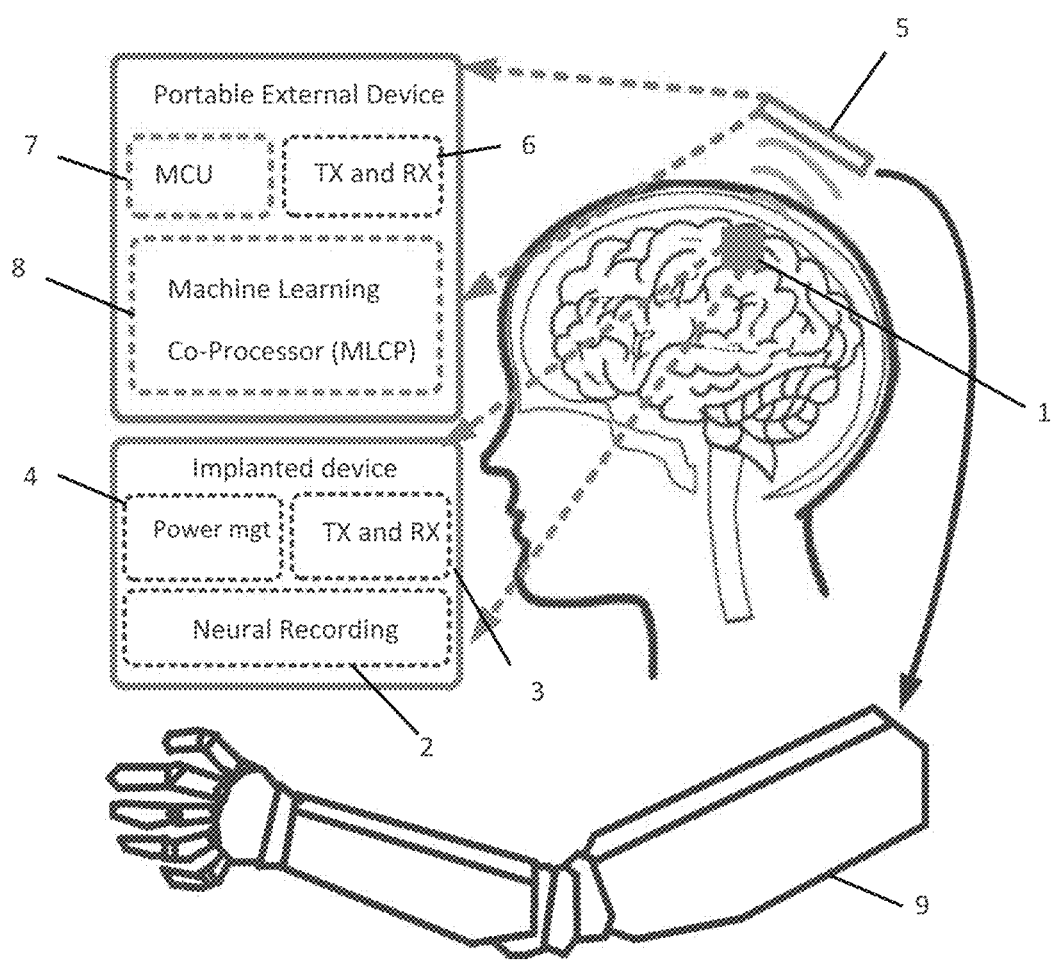
FIG. 2 shows schematically, a use of an embodiment of the invention.

Referring to FIG. 2, a first embodiment of the invention is illustrated. A micro-electrode array (MEA) 1 has been implanted into the brain of a subject. The MEA includes: a unit 2 comprising electrodes for recording of neural signals; a transmitting/receiving (TX/RX) unit 3 for transmitting the neural recordings out of the subject (and optionally receiving control signals and/or power); and a power management unit 4 for controlling the units 2, 3.

The subject also wears a portable external device (PED) 5 comprising: a TX/RX unit 6 for receiving the neural recordings from the unit 3 of the MEA 1; a microcontroller unit (MCU) 7 for pre-processing them, and a machine learning co-processor (MLCP) 8 for processing them as described below. The control output of the MLCP 8 is transmitted by the unit 6 to control a prosthesis 9.

In a second embodiment of the invention, the MLCP 8 is located not in the PED 5 but in the implanted MEA 1 This dramatically reduces the data which the unit 3 has to transmit out of the subject, and thus dramatically reduces the power which has to be provided by the power management unit 4. As described below, certain embodiments of the invention are integrated circuits which are suitable for use as the MLCP in such a scenario.

Figure 3:
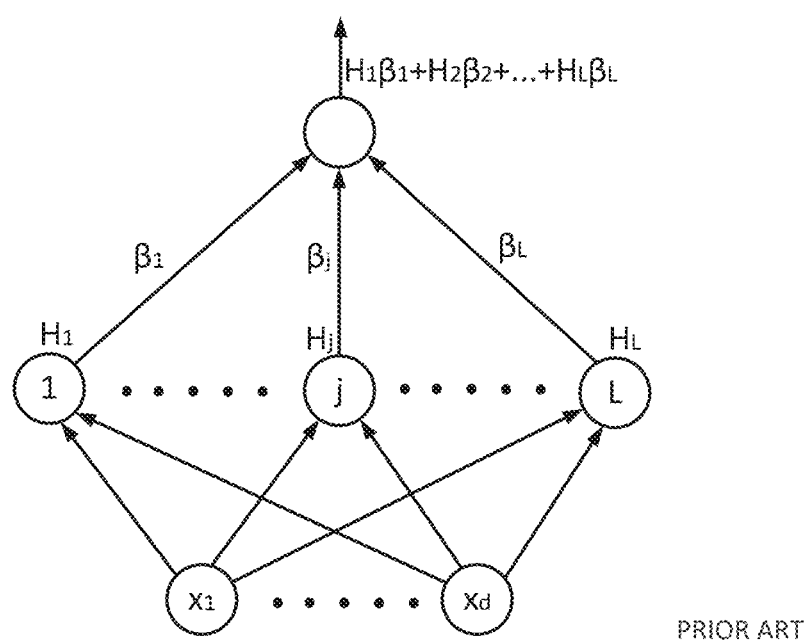
FIG. 3 shows the structure of ELM model.

Turning to FIG. 3, a network architecture is shown of a two-layer neural network which can be used by the MLCP 8, in an adaptive model known as the ELM algorithm. The network includes d input neurons with associated values $x_1, x_2, \ldots, x_d$, which can also be denoted as a vector x with d components. Thus, d is the dimension of the input to the network.

The outputs of these d input neurons are input to a hidden layer of L hidden neurons having an activation function g: R→R. [4] Without loss of generality, we consider a scalar output in this case. The output o of the network is given by:

$$o = \sum_{i}^{L} \beta_i h_i = \sum_{i}^{L} \beta_i g(w_i^T x + b_i), w_i, x \in R^d, \beta_i, b_i \in R \quad (1)$$

Note that in a variation of the embodiment, there are multiple outputs, each having an output which is a scalar product of $\{h_i\}$ with a respective vector of L weights $\beta^i$.

In general, a sigmoidal form of g( ) is assumed though other functions have also been used. Compared to traditional back propagation learning rule that modifies all the weights, in ELM $w_i$ and $b_i$ are set to random values and only the output weights, $\beta_i$ need to be tuned based on the desired output of N items of training data T=$[t_1 \ldots, tn, \ldots t_N]$, where $t_n$ is the desired output for n-th input vector $x^n$. Therefore, the hidden-layer output matrix H is actually unchanged after initialization of the input weights, reducing the training of this single hidden layer feed-forward neural network into a linear optimization problem of finding a least-square solution of β for Hβ=T, where β is output weights and T is the target of the training.

The desired output weights, $\hat{\beta}$ are then the solution of the following optimization problem:

$$\hat{\beta} = \min_\beta \|H\beta - T\| \quad (2)$$

where $\beta = [\beta_1 \ldots \beta_L]$ and $T = [t_1 \ldots t_N]$. The ELM algorithm proves that the optimal solution $\hat{\beta}$ is given by $\hat{\beta} = H^\dagger T$ where $H^\dagger$ denotes the Moore Penrose generalized inverse of a matrix.

The simple training algorithm brings advantages such as fast training speed and better generalization. More importantly for this invention, the reduction of the number of parameters that need to be tuned enables a simple hardware implementation. The output weights can be implemented using digital circuits, facilitating tuning. The fixed random input weights, however, can be realized by exploiting transistor mismatch which already commonly exists and becomes even profounder in the scaling of a modern deep sub-micrometer CMOS process. A microchip suitable for use in the invention is described in a later section to elaborate this point.

Figure 4:
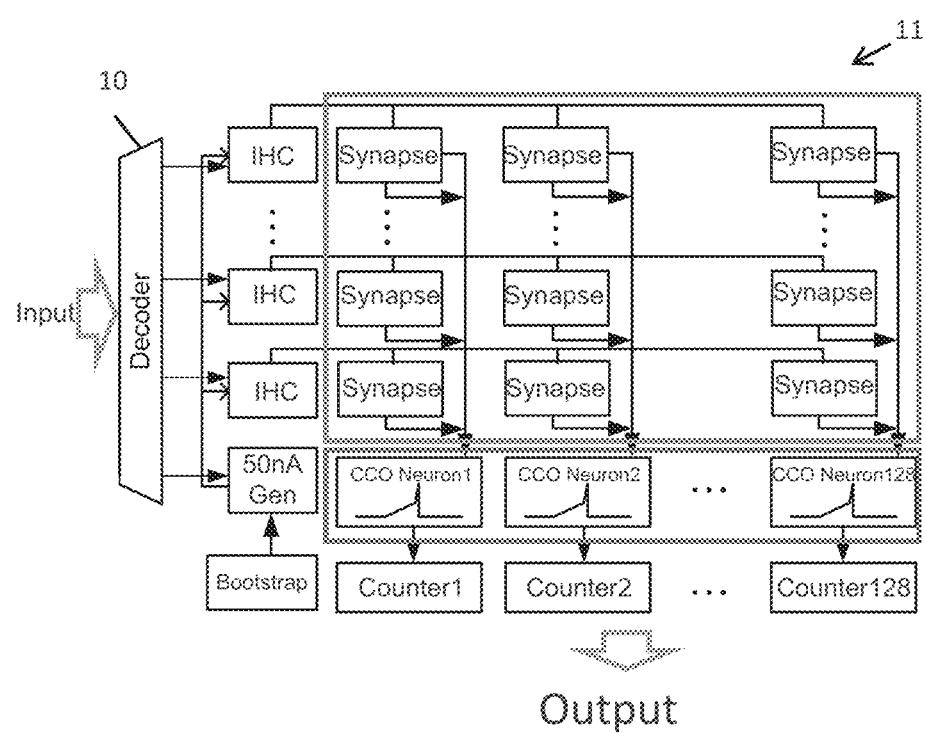
FIG. 4 shows the structure of a machine-learning co-processor of the embodiment of FIG. 2.

The architecture of the proposed classifier of the MLCP 8 that exploits the d×L random weights of the input layer is shown in FIG. 4. A decoder 10 receives the neural recordings and separates it into d data signals indicative of different sensors. The bootstrap and 50 nAGen are for generating the reference current used in the DACs of the IHC.

The processing portion of the classifier has 3 parts—(a) input handling circuits (IHC) to convert digital input to analog current, (b) a current mirror synapse array 11 for multiplication of the d input currents with random weights and sum up the results along the columns of the array and (c) L current controlled oscillator (CCO) neuron based ADCs. The second layer of the network is performed digitally on the output of the CCOs by the MCU 7 in FIG. 2. Typically, the determination of output weights is done offline and the learnt weights are downloaded to the MCU 7. The MCU 7 performs multiplications using these pre-determined weights as one input and the output of the CCOs as the second input.

We discuss this architecture below.

IHC

Figure 5:
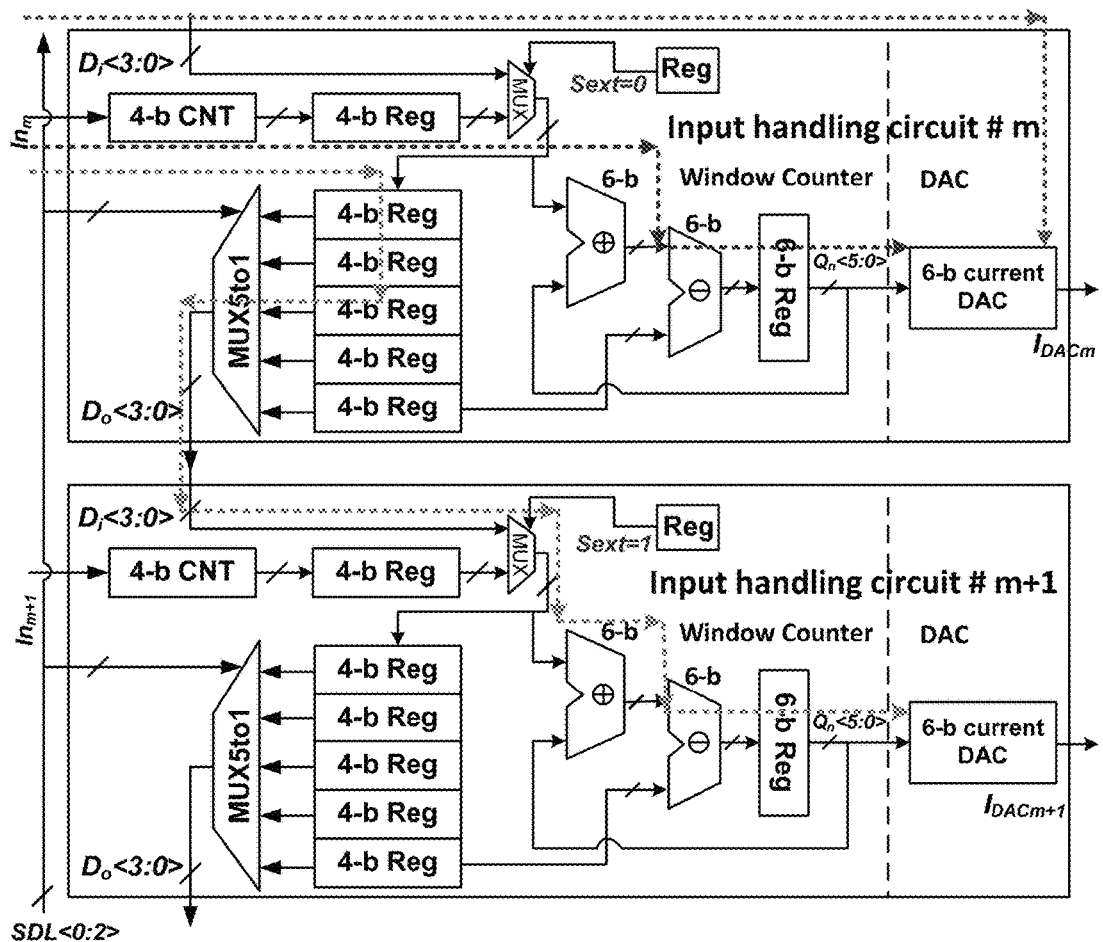
FIG. 5 is a circuit diagram of an input handling circuit of the arrangement of FIG. 4, for pulse frequency encoded input.

FIG. 5 shows the structure of two adjacent IHC units. Serial input data is decoded by the decoder 10, and a respective signal is transmitted to each IHC. The IHC can handle the input in three different ways as shown by the three dotted paths in FIG. 5. First, if the input is directly a binary encoded data, it can take the top path and be sent directly to a register for an n-bit DAC. We choose a current splitting DAC for its compact size [18]. For most machine learning examples, we have found 10 bits to be sufficient. These 10-bit DACs will split a fixed current (which can be selected based on a 5 bit master splitter with a maximum value of 50 nA) according to the input data value.

Second, for PFE data, it can follow either the middle dotted path, or the lowermost dotted path. Which path is taken depends on a 1-bit control signal—$S_{ext}$. First, a counter is used to count the number of pulses in the PFE signal in a fixed time window. A moving average of this count is calculated using a sliding window and the final moving average is input to the DAC for this channel. For neural decoding application, we have used a 6-bit DAC and 20 ms moving window. The input samples for the neural signal decoder are spike sequences from the neural recording channels. The positive pulses in the sequence indicate the timing of spike firing of one or a few neurons around the electrodes. The IHC is therefore needed to convert the spike sequences into input features that can be processed by following circuits. The function of the IHC in this case is to count the number of spikes in a moving window with a time step of $t_s$, and a window length of $5 \times t_s$, where $t_s$ is determined by input clock $T_{in}$. The entire decoder is therefore a discrete time system with sampling period of $t_s$. The 4-bit input counter and registers are all driven by input clock $T_{in}$. The results of counting in the window of $t_s$ are stored in sequence in 6 4-bit registers that connected in series. At every time step, a 6-bit full adder and A 6-bit full subtractor performs $Q_n = Q_{n-1} + C_{n-1} - C_{n-6}$ when $S_{ext} = 0$, equivalently counting number of spikes in a moving window with length of $5 \times t_s$. The $Q_n$ is then stored in a 6-bit register and is used as the input of a 6-bit current-mode digital-to-analog converter (DAC), the output current of which is used as input feature of the neural network based on the Extreme Learning Machine. Also, the counters are kept as 4-bit for a maximum input frequency of 800 Hz which is more than sufficient for neural decoding. It can be modified according to application needs and does not hurt the generality of the architecture.

Lastly, for time series data, by setting $S_{ext} = 1$, a delayed version of the count signal of the m-th channel can be sent to the DAC of the succeeding or (m+1)-th channel (i.e. the lowermost dotted path in FIG. 5). The desired delay can be chosen from 5 options between 20-100 ms using a 3-bit digital selection. This data can be further delayed and fed to the (m+2)-th channel and this daisy chain can be selected as desired based on the setting of $S_{ext}$ per channel. In this case, if there was data meant for the (m+1)-th or (m+2)-th channel, they can be sent to the next free channel by changing the setting of the decoder. Thus the dimension of input to ELM can be artificially increased by adding delayed samples. Though we show this only for the count signal, a binary encoded time series data may also be handled in this way by feeding it into the 4-bit register after the counter.

As illustrated in FIG. 5, the same embodiment may be operative to handle both binary encoded data and PFE data by appropriate switching. However, in other embodiments, the IHC is operative only to handle one of these two sorts of data, and is used only for in data of the appropriate sort.

Current Mirror Synapse Array

The random input weights are realized by a current mirror matrix. The analog current from IHC is copied over to every neuron using current mirror based analog synapses. In each row, the gates of the transistors are all connected to the diode-connected nFET that sinks the input current. And in each column, the drains of the transistors are connected to the input of the hidden-layer neuron of the column, so that the input current of each row is mirrored into the hidden-layer neuron. The summation of weighted input features is automatically done due to the current-mode operation. Minimum sized transistors are employed in these current mirrors to exploit VLSI mismatch which is necessary for the generation of random input weights $w_i$ and bias $b_i$ of ELM. For example, in the i-th input channel, output of the DAC is assumed to be $i_{in,i}$ while the total input current of neuron j is given by $i_{in,i} w_0 e^{\Delta VT,ij/UT}$ where UT is the thermal voltage, $w_0$ is the nominal current mirror gain while $\Delta VT,ij$ denotes the mismatch of the threshold voltage for the transistor copying the i-th input current to the j-th neuron. This last term is a random variable with a Gaussian distribution and hence the input weights w get mapped to random variables with a log-normal distribution. In this IC, d=L=128, i.e. we can have a maximum of 128 input dimensional data as well as a maximum of 128 hidden layer neurons. There is a provision for turning off unused input channels and hidden neurons to avoid wastage of power.

CCO-Neuron Based ADC

Figure 6:
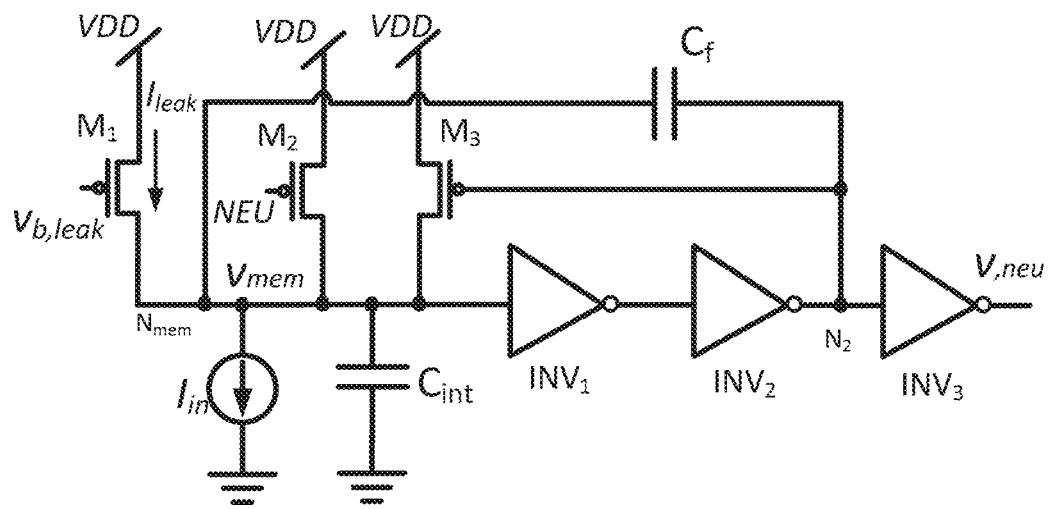
FIG. 6 is a circuit diagram of a neuronal oscillator.

The output current from the synapses are the input to the neuronal current controlled oscillator (CCO) [19] shown in FIG. 6. The neuron has to provide a saturating, monotonically increasing transfer function between input current and output frequency. The output counter counts the number of firing of the CCO-neuron in a certain time window. Combining these two blocks, the hidden-layer neuron convert the input current randomly projected by input weights into spike numbers, which is transmitted out of the microchip for further processing. 2 digital bits are kept to choose 4 values for each of the capacitors. The saturation of the output value is also digitally selected by stopping the counter once it reaches the pre-set saturation value. The saturation count can be programmed in the range of $2^6$ to $2^{13}$. Another nonlinearity can be introduced through the leak current from transistor M1 that creates a threshold offset in the neuron transfer curve. The spiking neuron outputs can be used to clock a counter and thus in a certain sampling time $T_s$, if each neuron i spikes $h_i$ times, the counter outputs will be a quantized version of neuron output frequency.

As noted above, a digital controller in the form of the MCU 7 can then perform the computation in second stage to produce $o = \Sigma_i \beta_i h_i$, a close approximation of o in equation (1). The digital controller will also reset the neuron and the counter every cycle making this architecture a locally asynchronous globally synchronous (LAGS) one.

Figure 7:
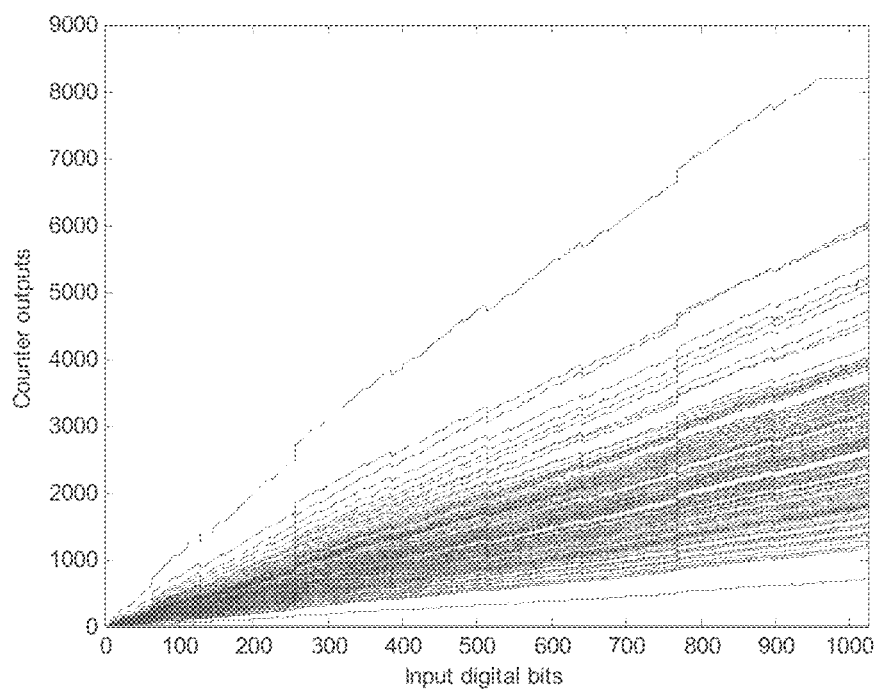
FIG. 7 illustrates a transfer function of 128 neurons.
Figure 8A:
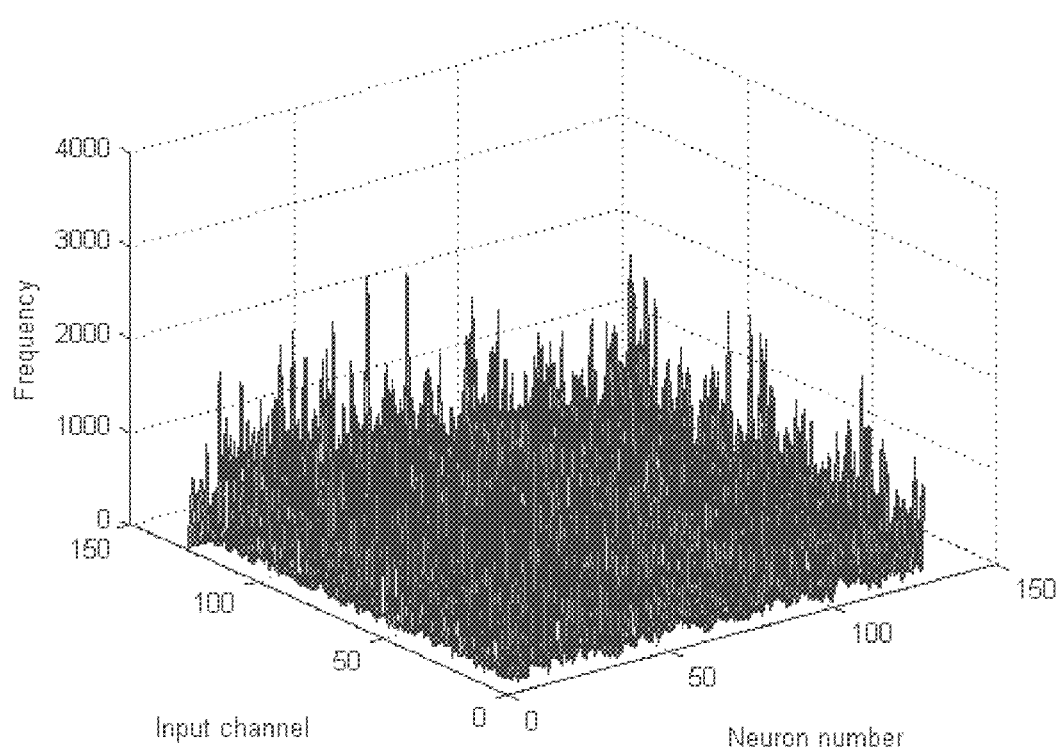
FIGS. 8(a) and (b) are composed of FIG. 8(a) which illustrates the output frequency of each neuron and each channel when the input is set to a fixed value, 100, showing the mismatch between the 128×128 synapses, and FIG. 8(b) which is a histogram of the counter output for each input weight.
Figure 8B:
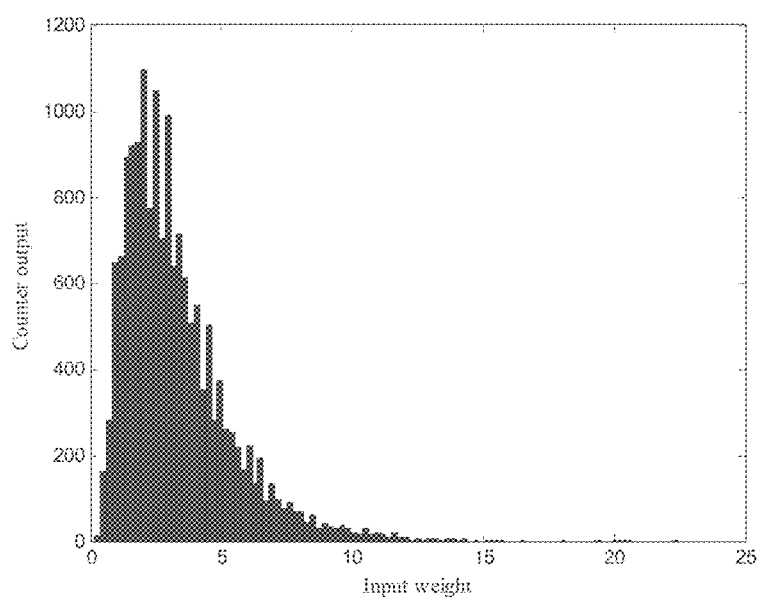

FIG. 7 shows the measured transfer functions of the 128 neurons where only one row of synapses are used to provide the input current. The mismatch in the transfer curves is due to both the synaptic and neuronal mismatches. The statistical variation in the 128×128 synapse array is shown in FIG. 8(a) by plotting the counter output when the input is a fixed digital code. The same data is plotted in FIG. 8(b) as a histogram to show the probability distribution of weight is log-normal as expected from theory.

EXPERIMENTAL RESULTS (i) Binary Encoded Digital Data

Figure 9:
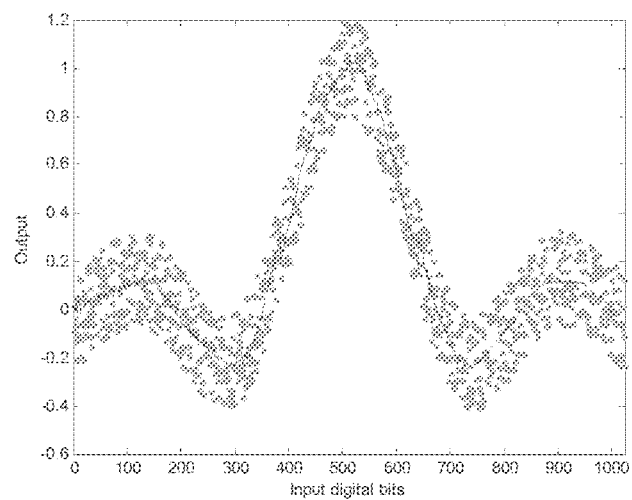
FIG. 9 illustrates a sinc function regression, where the dots are input data and the line is the approximated target function.

The hardware implementation of ELM for binary encoded digital input has been verified in applications of regression and classification. For the regression task, the network was given a set of noisy samples and had to approximate the underlying function. As shown in FIG. 9, the proposed method could achieve a regression accuracy of about 98% which is at par with software implementations [20]. The classification performance has been verified on several data-sets from the UCI machine learning repository [21]. The classification problems can be divided into several categories based on input dimension and size of training data set: small size and low dimensions (Pima Indians diabetes, Statlog Australian credit), small size and high dimensions (leukemia data set), large size and low dimensions (Star/Galaxy-Bright data set), large size and high dimensions (adult data set). These categories are shown in the first column of Table I. In the table, the second column shows the number of features in these data sets, or the dimension of the input data (corresponding to the number of input channels used). The third and fourth columns show the size of training data and testing data. The fifth column illustrates the classification performance, or mis-classification rate of the software ELM system with ideal sigmoid function as the hidden layer neuron. The last two columns are the performance of the system when we implement silicon CCO neuron in the hidden layer. From this table, we could see the device measurement results are quite similar to the simulation one, as well as the software ELM with sigmoid function.

TABLE I

Neuromorphic ELM performance, binary classification data sets

| Datasets | # Features | # Training data | # Testing data | Error (Sigmoid) | Error (Simulation) | Error (Measurement) |
|---|---|---|---|---|---|---|
| Diabetes | 8 | 512 | 256 | 0.2205 | 0.2298 | 0.2344 |
| Australian Credit | 6 | 460 | 230 | 0.1382 | 0.1517 | 0.1348 |
| Liver | 6 | 230 | 115 | 0.2699 | 0.2527 | 0.2522 |
| Brightdata | 14 | 1000 | 1462 | 0.0069 | 0.0081 | 0.0253 |
| Adult | 123 | 4781 | 27780 | 0.1541 | 0.1692 | 0.1557 |

We can also use the same chip to classify inputs with dimensions higher than 128—for such cases, the input data has to be divided into sub-parts and the chip has to be reused to produce the results separately for each part before combining it back.

(ii) Pulse Frequency Encoded Digital Data

The algorithm and microchip for the neural signal decoding are verified by dexterous finger movement classification using data recorded from monkey cortex. In the experiment described in detail by A. Poliakov and M. Schieber [22], the monkey is trained to perform tasks of flexing or extension of the fingers and the wrist of right hand according to the clues given. In the meanwhile, the neural signal of from the M1 region of monkey brain is recorded by the implanted MEA. Thus, the samples with input spike sequences and the correct movement are given for the training and testing of the neural signal decoding algorithm and microchip in the invention.

The training accuracy after training is around 96.7%. The decoding accuracy in the operational phase is 95.0%. This verification is done in the case where number of input channels is 40 and number of output channels is 60.

Figure 10A:
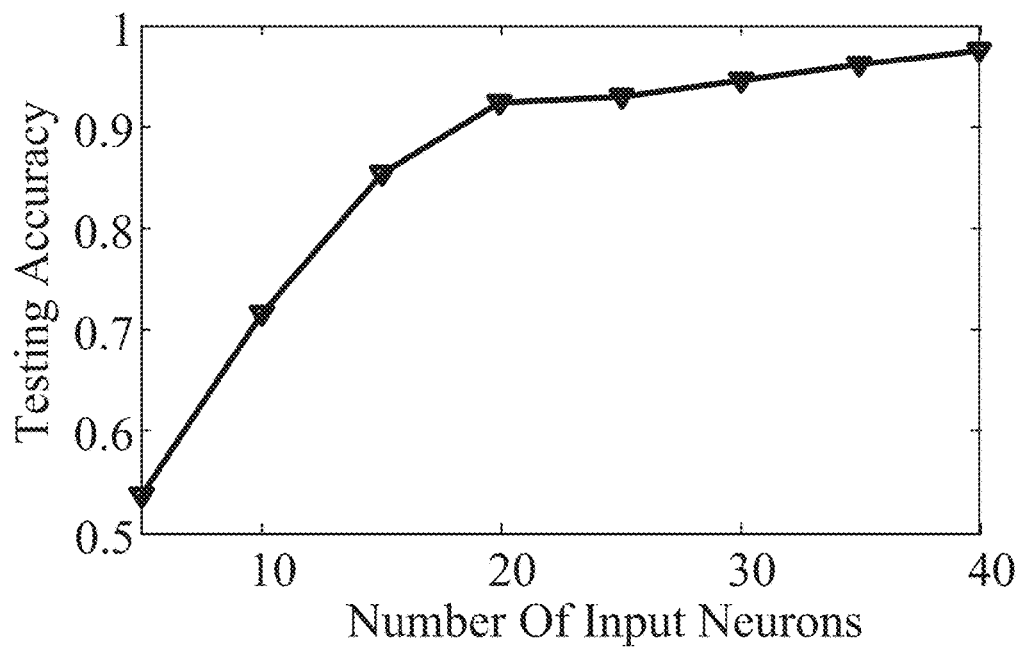
FIGS. 10(a) and (b) are composed of FIG. 10(a) which shows how decoding accuracy changes with the number of the input neurons, and FIG. 10(b) which shows how the decoding accuracy changes with the number of the hidden-layer neurons.
Figure 10B:
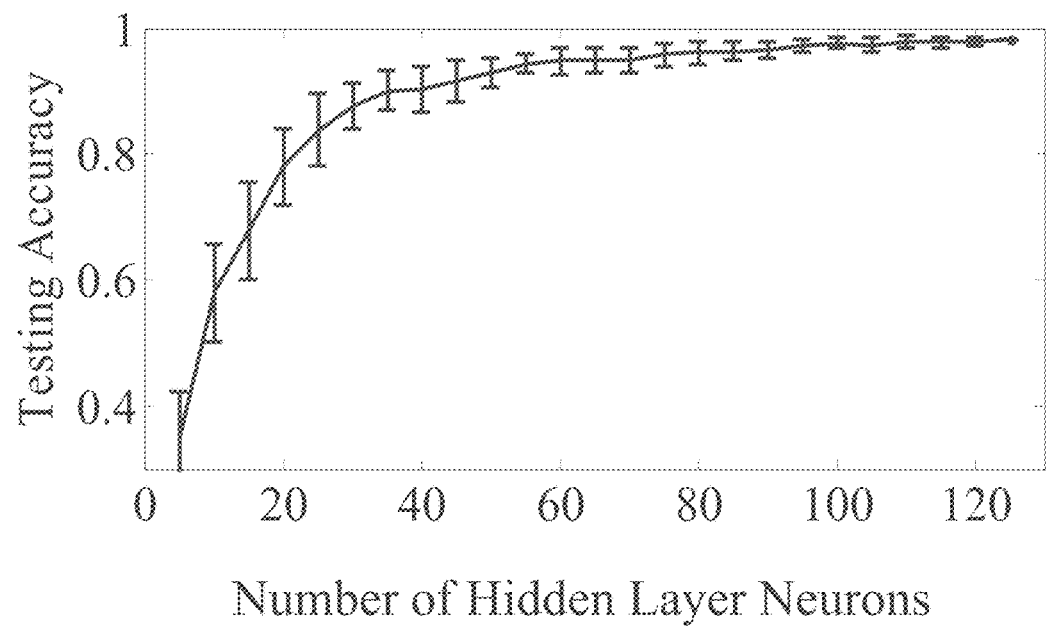

The power consumption of the microchip is determined by the number of input channels and the number of hidden-layer neurons used. The decrease of the dimension, either of inputs or of outputs would lead to a reduction of the power consumption. It, however, will also cause the decrease of the classification accuracy. A trade-off between accuracy and power consumption is involved here, requiring optimization according to the requirement of the system in which the decoding microchip is used. The FIG. 10 shows how the classification accuracy changes with input feature dimension in (a) and the number of hidden-layer neurons in (b).

Figure 11:
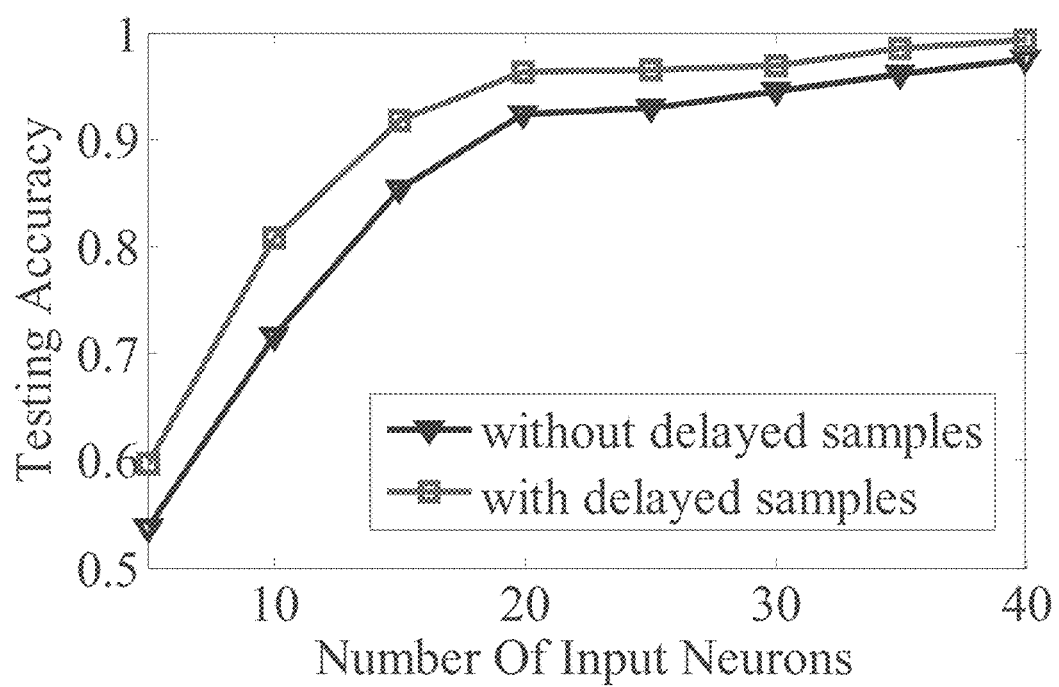
FIG. 11 shows how the decoding accuracy of the microchip varies with the number of input neurons with or without adding delayed spike sequences.

Finally, the system measurement result is shown in FIG. 11 comparing classification accuracy of decoding with and without input dimension increase by inducing delayed spike sequences. The cortex data is the same as mentioned above. The lines in the FIG. 11 show the decoding accuracy as the input dimension increases in both cases of with and without input dimension increase by delay. Furthermore, as shown in FIG. 11, the decoding accuracy with input dimension increase is higher than the one without input dimension increase, and reaches a saturation of decoding accuracy earlier.

(iii) Fabricated Integrated Circuit

Figures 12A, 12B:
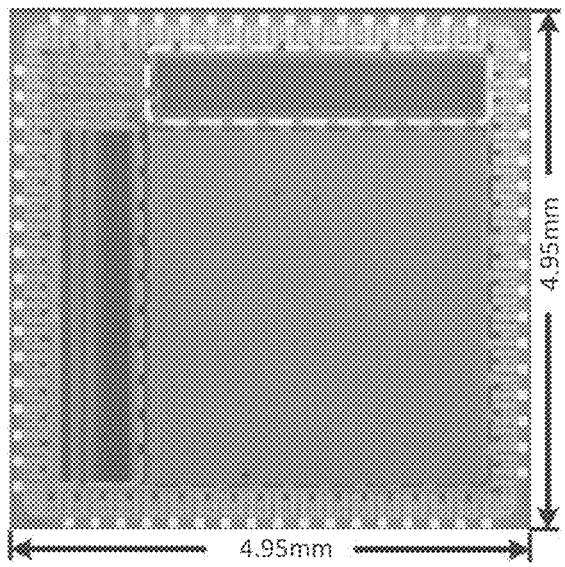
FIGS. 12(a) and (b) are composed of FIG. 12(a) which is a photograph of a CMOS integrated circuit of the type shown in FIG. 4, and FIG. 12(b) which gives the characteristics of the CMOS integrated circuit.

FIG. 12(a) is a die photo of a 4.95 mm×4.95 mm MLCP in 0.35 μm CMOS implementation which is an embodiment of the invention supporting both d and L up to 128. A summary of its specifications is given in FIG. 12(b). According to measurements, the power dissipation of the ELM in a neural decoding problem was 0.4 μW at a 50 Hz classification rate. This resulted in an energy efficiency of 290GMACS/W where MAC stands for a Multiply-and-Accumulate operation.

Commercial Applications of the Invention

A machine learning system which is an embodiment of the present invention can be used in any application requiring data based decision making in low-power. We have already shown the example of neural signal decoding in BMI. Here, we outline several other possible use cases:

1. Implantable/Wearable Medical Devices:

There has been a huge increase in wearable devices that monitor ECG/EKG/Blood Pressure/Glucose level etc. in a bid to promote healthy and affordable life styles. Typically, these devices operate under a limited energy budget with the biggest energy hog being the wireless transmitter. An embodiment of the invention may either eliminate the need for such transmission or drastically reduces the data rate of transmission. As an example of a wearable device, consider a wireless EEG monitor that is worn by epileptic patients to monitor and detect the onset of a seizure. An embodiment of the invention may cut down on wireless transmission by directly detecting seizure onset in the wearable device and triggering a remedial stimulation or alerting a caregiver.

In the realm of implantable devices, we can take the example of a cortical prosthetic aimed at restoring motor function in paralyzed patients or amputees. The amount of power available to such devices is very less and unreliable—being able to decode the motor intentions within the body in a micropower budget enable drastic reduction in data to be transmitted out.

2. Wireless Sensor Networks:

Wireless sensor nodes are used to monitor structural health of buildings and bridges or for collecting data for weather prediction or even in smart homes to intelligently control air conditioning. In all such cases, being able to take decisions on the sensor node through intelligent machine learning will enable long life time of the sensors without requiring a change of batteries. In fact, the power dissipation of the node can reduce sufficiently for energy harvesting to be a viable option. This is also facilitated by the fact that the weights are stored in a non-volatile manner in this architecture.

3. Data Centres:

Today, data centres are becoming more prevalent due to the increasing popularity of cloud based computing. But power bills are the largest recurring cost for a data centre [23]. Hence, low-power machine learning solutions could enable data centres of the future by cutting their energy bills drastically.

Variations of the Invention

A number of variations of the invention are possible within the scope and spirit of the invention, as will be clear to a skilled reader.

A. Reservoir Computing Systems.

Figure 13:
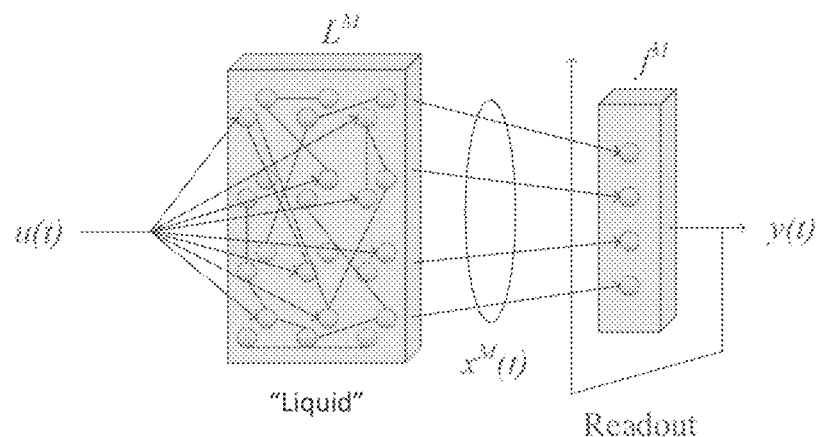
FIG. 13 shows a known liquid state machine, which can be used in a variant of the embodiment.

An ELM is closely related to a class of adaptive networks referred to as a reservoir computer system. In general, a reservoir computing system refers to a time variant dynamical system with two parts—(1) a recurrent connected set of nodes (referred to as the "liquid" of "the reservoir") with fixed connection weights to which the input is connected and (2) a readout with tunable weights that is trained according to the task. Two major types of reservoir computing systems are popularly used—the Liquid state machine (LSM) [24] and the Echo state network (ESN) [25]. FIG. 13 shows a depiction of a LSM network where the input signal u(t) is connected to the "liquid" of the reservoir which implements a function $L^M$ on the input to create internal states $x^M(t)$, i.e. $x^M(t)=(L^M u)(t)$. The states of these nodes, xM(t) are used by a trainable readout $f^M$, which is trained to use these states and approximate a target function. The major difference between LSM and ESN is that in LSM, each node is considered to be a spiking neuron that communicates with other nodes only when its local state variable exceeds a threshold and the neuron emits a "spike" whereas in ESN, each node has an analog value and communicates constantly with other nodes. In practice, the communication between nodes for ESN and state updates are made at a fixed discrete time step.

Extreme Learning Machines (ELM) can be considered as a special case of reservoir learning where there are no feedback or recurrent connections within the reservoir. Also, typically the connection between input and hidden nodes is all-to-all in ELM while it may be sparse in LSM or ESN. Finally, the neurons or hidden nodes in ELM have an analog output value and are typically not spiking neurons. However, they may be implemented by using spiking neuronal oscillators followed by counters as shown in the patent draft. Next, we briefly explain how LSM or ESN may be implemented in hardware as embodiments of the invention, replacing the ELM.

Figure 14:
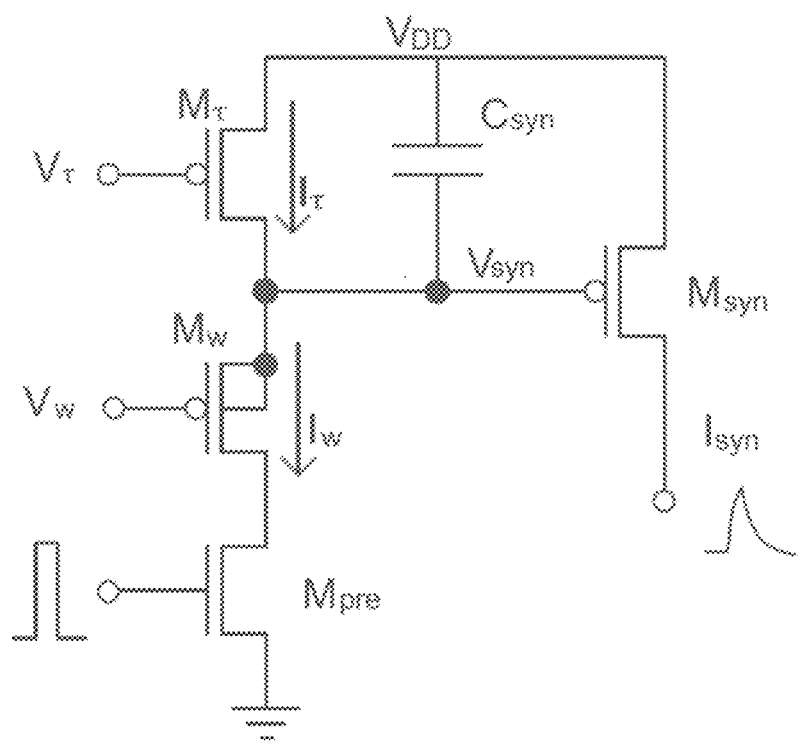
FIG. 14 shows an input circuit for one input of the liquid state machine in the variant of the embodiment.

To implement the LSM, hidden nodes can be any spiking neuron circuit that can convert input analog signals to a digital pulse or spike. Several examples of such circuits are described in [26]. The input pulses (u(t)) as well as the pulses generated by the hidden nodes ($x^M(t)$) may be connected to IHC circuits that accept a pulse as an input and converts it to an analog signal. As an example, if the mode of representing analog signal is currents, the circuit shown in FIG. 14 may be used to convert an input digital pulse or spike to an analog current Isyn. Several other such circuits are described in [27]. This current is scaled by random factor and supplied to the input of other hidden nodes. As described in the present invention, this may be done by exploiting the inherent mismatch in current mirror circuits. Note that in this case no counters are needed in the IHC or after the spiking neuronal oscillators of the hidden node.

To implement ESN, the hidden node can implement a spiking neuronal oscillator followed by a counter just as described above for an ELM. This digital value ($x^M(t)$) is sampled at every discrete time step of updating states and can be applied to the input of the network through a DAC producing output currents. To implement the random scaling of the inputs, again mismatch in current mirrors may be utilized, as in the embodiment explained in detail above. Also, if the input (u(t)) is a binary encoded digital signal, it can be applied to a current DAC followed by random scaling using current mirrors. Otherwise, if it is a current signal, it can be directly applied to the current mirrors through a diode connected transistor as the IHC.

B. Movement Onset

Figure 15:
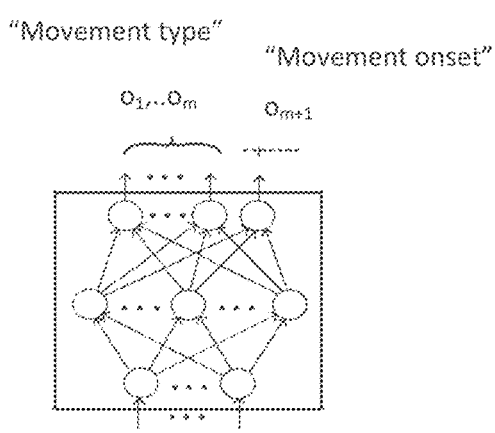
FIG. 15 is a variant of the ELM model of FIG. 3.

One task for which an embodiment of the invention can be employed is recognising motions. FIG. 15 shows a variation of the ELM which can be used for this purpose. The first hidden layer of the ELM is the same as explained above. However, the second layer has two sections: a first section containing M outputs, $o_1, \ldots o_M$ where M is greater than 1, and a second section with just one output $o_{M+1}$.

The input to the network may be the outputs of brain sensors sensing neuronal activity in the brain of a subject. As noted above, each of the M outputs is defined using a corresponding vector of second layer weights. The first section of the second layer is trained, in the way explained above, to recognise one of M types of movements. The output of this section of the second layer is the one of the M outputs $o_1, \ldots, o_M$ having the highest value. This is referred to as $s(t_k)$.

The second section of the second layer is used to recognise the onset of the motion. The output $o_{M+1}$ is trained by regression, and the target is a trapezoidal fuzzy membership function which gradually rises from 0 to 1 representing the gradual evolution of biological neural activity. This output $o_{M+1}$ is thresholded to produce the final output $G(t_k)$ at time $t_k$ as $G(t_k)=1$ is $o_{M+1}$ is above a threshold $\theta$, and zero otherwise. The threshold $\theta$ is optimized as a hyper-parameter. Moreover, to reduce spurious classification and produce a continuous output, the primary output G(tk) is processed to create $G_{track}$(tk) that is high only if G is high for at least $\lambda$ times over the last $\tau$ time points. Further, to reduce false positives, another detection is prohibited for $T_r$ milliseconds after a valid one. The final decoded output, $F(t_k)$ is obtained by a simple combination of the two classifiers as $F(t_k)=G_{track}(t_k) \times s(t_k)$.

C. Removal of Unnecessary Hidden Layer Neurons

It is observed that for some computational tasks, the value of $\hat{\beta}$ given by Eqn. (2) is very low for one or more of the L hidden neurons. In this case, the corresponding hidden layer neuron has little influence on the output. It is possible to reduce the computational cost of the MCU 7 by omitting hidden neuron(s) with very low values of $\hat{\beta}$ (e.g. below a certain threshold), and performing the calculation of $\hat{\beta}$ again using only the remaining hidden neurons.

REFERENCES

The disclosure of the following references is incorporated herein:

[1] E. Yao, S. Hussain, A. Basu, and G.-B. Huang, "Computation using mismatch: Neuromorphic extreme learning machines," in Proc. Biomed. Circuits Syst. Conf., 2013, pp. 294-297.

[2] Lichtsteiner, P., C. Posch and T. Delbruck, "A 128×128 120 dB 15 us Latency Asynchronous Temporal Contrast Vision Sensor," *IEEE Journal of Solid State Circuits, February* 2008, vol. 43, no. 2, pp. 566-576, 2007.

[3] V. Chan, S.-C. Liu, and A. van Schaik, "AER EAR: A matched silicon cochlea pair With Address Event Representation interface", *IEEE Transactions on Circuits and Systems I*, vol. 54, pp. 48-59, 2007.

[4] G.-B. Huang, H. Zhou, X. Ding, and R. Zhang, "Extreme learning machine for regression and multiclass classification," IEEE Trans. Syst., Man, Cybern. B, Cybern., vol. 42, no. 2, pp. 513-529, April 2012.

[5] B. Rapoport, R. Sarpeshkar and W. Wattanapanitch; "Low-power analog-circuit architecture for decoding neural signals", US Patent, 2008, US20080294579 A1.

[6] B. Rapoport, L. Turicchia, W. Wattanapanitch, T. Davidson and R. Sarpeshkar; "Efficient universal computing architectures for decoding neural activity", PLoS ONE 7(9): e42492.

[7] Ta-Wen Kuan, Jhing-Fa Wang, Jia-Ching Wang, Po-Chuan Lin and Gaung-Hui Gu, "VLSI Design of an SVM Learning Core on Sequential Minimal Optimization Algorithm," Very Large Scale Integration (VLSI) Systems, IEEE Transactions on, vol. 20, no. 4, pp. 673, 683, April 2012.

[8] Kyunghee Kang; Shibata, T., "An On-Chip-Trainable Gaussian-Kernel Analog Support Vector Machine," Circuits and Systems I: Regular Papers, IEEE Transactions on, vol. 57, no. 7, pp. 1513, 1524, July 2010.

[9] D. Anguita, A. Boni, and S. Ridella, "A digital architecture for support vector machines: Theory, algorithm, and FPGA implementation," IEEE Trans. Neural Netw., vol. 14, no. 5, pp. 993-1009, September 2003.

[10] D. Anguita, A. Boni, and S. Ridella, "Learning algorithm for nonlinear support vector machines suited for digital VLSI," Electron. Lett., vol. 35, no. 16, pp. 1349-1350, 1999.

[11] Kyong Ho Lee, N. Verma, "A Low-Power Processor With Configurable Embedded Machine-Learning Accelerators for High-Order and Adaptive Analysis of Medical-Sensor Signals," Solid-State Circuits, IEEE Journal of, vol. 48, no. 7, pp. 1625, 1637, July 2013.

[12] S. Chakrabartty and G. Cauwenberghs, "Sub-microwatt analog VLSI trainable pattern classifier," IEEE Trans. Solid-State Circuits, vol. 42, no. 5, pp. 1169-1179, May 2007.

[13] P. Kucher and S. Chakrabartty, "An energy-scalable margin propagation-based analog VLSI support vector machine," in Proc. IEEE Int. Conf. Circuits Syst. (ISCAS), May 2007, pp. 1289-1292.

[14] S. Y. Peng, B. A. Minch, and P. Hasler, "Analog VLSI implementation of support vector machine learning and classification," in Proc. IEEE Int. Symp. Circuits Syst. (ISCAS), May 2008, pp. 860-863.

[15] J. Lu, S. Young, I. Arel and J. Holleman, "A 1TOPS/W Analog Deep Machine-Learning Engine with Floating-Gate Storage in 0.13 μm CMOS," Solid-State Circuits Conference Digest of Technical Papers (ISSCC), 2014 IEEE International, vol., no., pp. 504, 505, 9-13 Feb. 2014.

[16] Decherchi S., Gastaldo P., Leoncini A. and Zunino R., "Efficient Digital Implementation of Extreme Learning Machines for Classification," Circuits and Systems II: Express Briefs, IEEE Transactions on, vol. 59, no. 8, pp. 496, 500, August 2012.

[17] A. Basu, S. Shuo, H. Zhou, M. H. Lim, and G.-B. Huang, "Silicon spiking neurons for hardware implementation of extreme learning machines," Neurocomputing, vol. 102, pp. 125-134, 15 Feb. 2013.

[18] T. Delbruck and A. Van Schaik, "Bias current generators with wide dynamic range" *Analog Integrated Circuits and Signal Processing*, vol. 43, no. 3, pp. 247-68, 2005.

[19] C. Mead, Analog VLSI and Neural Systems, Addison-Wesley, Reading, M A, 1989.

[20] G.-B. Huang, Q.-Y. Zhu and C.-K. Siew, "Extreme Learning Machine: Theory and Applications", *Neurocomputing*, vol. 70, pp. 489-501, 2006.

[21] http://archive.ics.uci.edu/ml/.

[22] A. Poliakov and M. Schieber, "Limited functional grouping of neurons in the motor cortex hand area during individuated finger movements: A cluster analysis," J. Neurophysiology, vol. 82, pp. 3488-505, December 1999.

[23] http://en.wikipedia.org/wiki/Data_center#Energy_efficiency

[24] Maass, Wolfgang; Natschläger, Thomas; Markram, Henry, "Real-time computing without stable states: a new framework for neural computation based on perturbations" (PDF), Neural Comput 14 (11): 2531-60, November 2002.

[25] Jaeger H. and Haas H. (2004) Harnessing nonlinearity: Predicting chaotic systems and saving energy in wireless communication. Science, 304:78-80, 2004.

[26] C. Bartolozzi and G. Indiveri, "Synaptic Dynamics in Analog VLSI," Neural Computation, vol. 19, no. 10, pp. 2581-2603, 2007.

[27] G. Indiveri et. al, "Neuromorphic Silicon Neuron Circuits," Frontiers in Neuroscience, vol. 5, 2011.

The invention claimed is:

1. A computational system to implement an adaptive model to process a plurality of input signals, the system including:
    an input handling section, for receiving the input signals and converting them into a plurality of analog output signals, the input handling section comprising a digital-to-analog converter for receiving digital input values expressed as multi-digit digital numbers, and from them generating the analog output signals;
    a multiplicative section adapted to perform a plurality of multiplication operations on each analog output signal using respective analog circuits;
    electrical components comprised in the respective analog circuits, the electrical components having tolerances, the tolerances being used to generate respective randomly-set parameters for performing the plurality of multiplication operations;
    an analog-to-digital conversion section for forming a plurality of sum values, each sum value being the sum of a plurality of the results of the multiplication operations, and converting the sum values into digital values; and
    a processing unit for receiving the digital values, and generating an output as a function of the digital values and a respective set of variable parameters.

2. The computational system of claim 1, further including a wireless interface for receiving the set of variable parameters from an external device.

3. The computational system of claim 1, in which the multiplicative section performs the multiplication operations in the current domain.

4. The computational system of claim 1, in which said analog circuits are current mirror circuits operated in a sub-threshold regime.

5. The computational system of claim 1, in which the input handling section is operative, for said input signals in the form of pulse frequency encoded (PFE) digital input, to form the multi-digit digital values as a moving average of an input pulse count over a pre-defined time window.

6. The computational system of claim 1, in which the digital-to-analog conversion input section is operative, for said input signals in the form of time series data, to form a plurality of said analog signals as samples of said digital data input at different respective times, whereby said digital values are each a function of a plurality of said samples.

7. The computational system of claim 1, in which the analog-to-digital conversion section includes:
    a plurality of current controlled oscillator (CCO) units, each current controlled oscillator unit being arranged to fire based on the result of a plurality of said multiplication operations, and
    for each CCO unit, a counter arranged to count the number of firings of the CCO unit in a time window.

8. A computational system to implement an adaptive model to process a plurality of input signals, the system including:
    an input handling section, for receiving the input signals as digital signals and converting them into a plurality of analog output signals;
    a multiplicative section adapted to perform a plurality of multiplication operations on each analog output signal using respective analog circuits;
    electrical components comprised in the respective analog circuits, the electrical components having tolerances, the tolerances being used to generate respective randomly-set parameters for performing the plurality of multiplication operations;

an analog-to-digital conversion section for converting the results of the multiplication operations into digital values, and including:
(i) a plurality of current controlled oscillator (CCO) units, each current controlled oscillator unit being arranged to fire based on the result of a plurality of said multiplication operations
(ii) for each current controlled oscillator unit, a counter arranged to count the number of firings of the CCO unit in a time window; and
a processing unit for receiving the digital values, and generating an output as a function of the number of firings of the CCO units and a respective set of variable parameters.

9. A computer-implemented method to process a plurality of input signals, the method including:
(i) receiving the input signals and converting them into a plurality of analog output signals, the conversion comprising: receiving digital input values expressed as multi-digit digital numbers, and from the digital input values generating the analog output signals;
(ii) generating randomly-set parameters using tolerances in electrical components of respective analog circuits;
(iii) performing a plurality of multiplication operations on each analog output signal using the randomly-set parameters generated in the respective analog circuits;
(iv) forming a plurality of sum values, each sum value being the sum of a plurality of the results of the multiplication operations, and converting the sum values into digital values; and
(v) receiving the digital values, and generating an output as a function of the digital values and a respective plurality of variable parameters.

10. The method of claim 9, further including receiving the plurality of variable parameters wirelessly from an external device, the variable parameters having been obtained from:
(i) a set of training data illustrative of a computational task to be performed by the adaptive model,
(ii) the randomly-set parameters.

11. The method of claim 10, in which the variable parameters are obtained from a process of:
(i) seeking variable parameters which minimise a cost function formed from the training data and the randomly-set parameters;
(ii) identifying variable parameters having a value below a threshold;
(i) forming a modified cost function omitting the identified variable parameters; and
(ii) minimising the modified cost function.

12. The method of claim 9, in which said analog circuits are current mirror circuits operated in a sub-threshold regime.

13. The method of claim 9, in which said input signals are in the form of pulse frequency encoded (PFE) digital input, the method including forming the multi-digit digital values as a moving average of an input pulse count over a pre-defined time window.

14. The method of claim 9, in which said input signals are in the form of time series data,
the method including forming the multi-digit digital values by taking samples of said digital data input at different respective times, said digital values each being a function of a plurality of said samples.

15. The method of claim 9, in which the sum values are converted to digital values by:
transmitting the result of a plurality of said multiplication operations to an input of a current controlled oscillator (CCO) unit to control the firings of the CCO unit, and
counting the number of firings of the CCO unit in a time window.

16. The method of claim 9 in which the input signals are generated by sensors located within a human or animal subject, and at least steps (i) to (iii) are performed by electronic units located within the subject.

17. The method of claim 16, further comprising controlling movement of a prosthesis based on the output.

18. The method of claim 16, in which a plurality of outputs are generated based on respective sets of said variable parameters, the outputs including a plurality of first outputs indicative of respective motions of the subject.

19. The method of claim 18, in which the outputs include at least one second output indicative of the onset of a motion of the subject.

20. A computational method of processing a plurality of input signals, the method including:
receiving the input signals as digital signals and converting the input signals into a plurality of analog output signals;
generating randomly-set parameters using tolerances in electrical components of respective analog circuits;
performing a plurality of multiplication operations on each analog output signal using the randomly-set parameters generated in the respective analog circuits;
transmitting to each of a plurality of current controlled oscillator (CCO) units, a control signal based on the result of a respective plurality of said multiplication operations;
counting the number of firings of each CCO unit in a time window; and
generating an output as a function of the number of firings of each CCO unit and a respective set of variable parameters.

* * * * *